United States Patent
Rawlings et al.

(10) Patent No.: US 8,061,988 B1
(45) Date of Patent: Nov. 22, 2011

(54) PROCESS FOR CONJUGATE CFD ANALYSIS OF A TURBINE AIRFOIL

(75) Inventors: Christopher K. Rawlings, Jupiter, FL (US); James P. Downs, Jupiter, FL (US); Kenneth K. Landis, Tequestra, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 1037 days.

(21) Appl. No.: 11/986,026

(22) Filed: Nov. 19, 2007

(51) Int. Cl.
*G06G 7/50* (2006.01)
(52) U.S. Cl. .......................................... 416/97 R; 703/9
(58) Field of Classification Search ......................... None
See application file for complete search history.

(56) References Cited

U.S. PATENT DOCUMENTS 5,738,493 A * 4/1998 Lee et al. ..................... 416/97 R

OTHER PUBLICATIONS

J. Kruckels, Turbine blade thermal design process enhancements for increased firing temperatures and reduced coolant flow, Proceedings of GT2007 ASME Turbo Expo 2007, Power for Land, Sea and Air, May 14-17, Montral, Canada.

S. Na, Internal and film cooling of a flat plate with conjugate heat transfer, Proceedings of GT2007 ASME Turbo Expo 2007, Power for Land, Sea and Air, May 14-17, Montral, Canada.

Gregory M. Laskowski, Heat transfer predictions of film cooled stationary turbine airfoils, Proceedings of GT2007 ASME Turbo Expo 2007, Power for Land, Sea and Air, May 14-17, Montral, Canada.

* cited by examiner

*Primary Examiner* — Richard Edgar
(74) *Attorney, Agent, or Firm* — John Ryznic

(57) ABSTRACT

The present invention is a process for designing the internal cooling passages with these small scale features using a meshed solid model in a FEA program to perform the CFD analysis. Instead of modeling these small scale features (cooling holes, impingement holes, and turbulators) in the meshed FEA solid model, most of the small scale features are replaced by grid extraneous source terms in which the small scale feature is eliminated from the solid model and replaced with point source terms. The source terms can duplicate the effect of the feature within the analysis without requiring the complex analysis that such features would require in the analysis. Text files for each of the cooling holes, impingement holes and turbulators are inputted and then translated into grid extraneous source terms that include position, energy, and continuity. A conjugate CFD solver performs an analysis and produces new values for the thermal and boundary conditions.

13 Claims, 2 Drawing Sheets

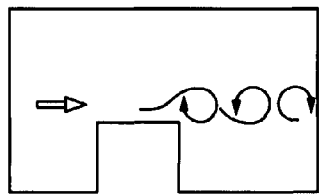
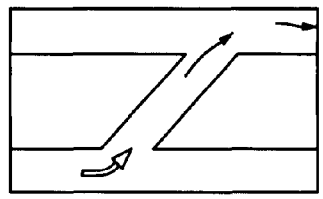
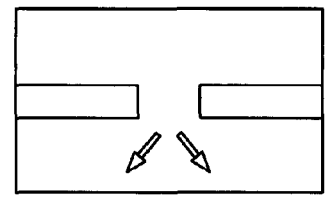
Fig 1a　　　　　　Fig 2a　　　　　　Fig 3a
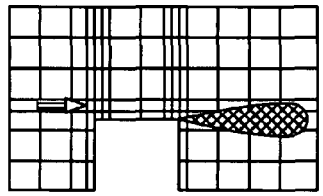
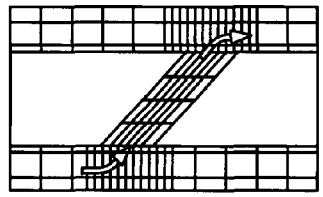
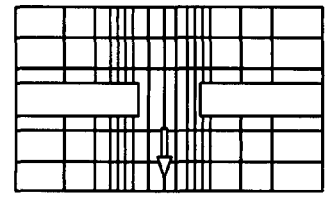
Fig 1b　　　　　　Fig 2b　　　　　　Fig 3b
Prior Art　　　　　Prior Art　　　　　Prior Art
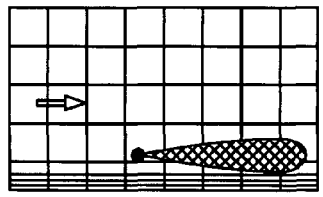
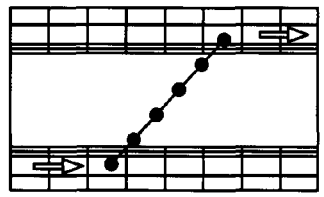
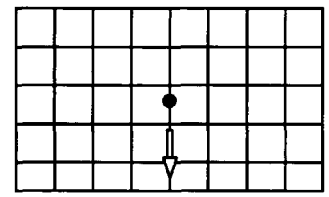
Fig 1c　　　　　　Fig 2c　　　　　　Fig 3c
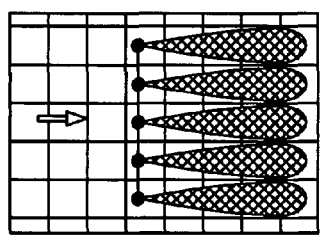
Fig 1d

PROCESS FOR CONJUGATE CFD ANALYSIS OF A TURBINE AIRFOIL

BACKGROUND OF THE INVENTION

1. Field of the Invention

The present invention relates generally to air cooled turbine airfoils, and more specifically to a process for modeling of specific detailed features including turbulators, impingement holes and film holes in a turbine airfoil.

2. Description of the Related Art Including Information Disclosed Under 37 CFR 1.97 and 1.98

A gas turbine engine includes a turbine section with at least one stage of stator vanes and rotor blades that are exposed to a high temperature gas flow from the combustor for the extraction of mechanical energy used to drive the compressor of the engine, or in the case of an industrial gas turbine engine (IGT) to also drive an electric generator. It is well known in the art of gas turbine engines that the efficiency of the engine can be increased by passing a higher temperature gas flow into the turbine. However, a limit to the highest temperature is imposed by the material properties of the first stage airfoils and to the amount of internal cooling provided to these airfoils. Later stages of airfoils also may require cooling but are not as limiting as to the turbine inlet temperature as are the first stage airfoils because the first stage is exposed to the highest temperature.

A cooled turbine blade design for a heavy-duty gas turbine has major specification targets to be achieved, which include performance, emissions, lifetime, and cost and development time. The front stages of the gas turbine are exposed to the most severe conditions in terms of loading, specifically the thermal loads, requiring materials such as nickel based single crystal alloys, which result in associated costs in the manufacturing supply chain. The consequences of working closer to an achievable technology limit in general results in engineering design of new components being complex, engineering development time raises and constraints become more severe, overall investment risks increase, individual process steps become more dependent on each other and interfaces get more complex, and the available response time to field issues are reduced. Desired inlet temperatures are about 2150 K for an aircraft engine and 1850 K for an IGT, which far exceed the allowable material temperatures of 1320 to 1475 K for super alloys without thermal barrier coatings (TBC) and 1475 to 1625 K with a TBC. But, effective in addition to efficient cooling are needed because the slightest over temperature in any part of the turbine material such as a hot spot in a blade or vane from insufficient cooling will lead to failure of that part.

Lifting of cooled turbine blades and vanes is also an important design factor in a gas turbine engine. These airfoils are exposed to cycles of high operating temperature with high stress levels due to rotation and/or pressure forces followed by low temperatures and forces when the engine is shut down. Lifting of cooled turbine blades requires three-dimensional finite element models to be available which represent the part detail in a physically reduced complexity which can be handled with available methods and computing power. It takes development engineers involved (mainly aerodynamic design, mechanical design, cooling and mechanical integrity) several months to get an iterated feasible design solution, where, what is often called an "optimum solution", has been allowed only limited iterations on the overall three-dimensional level involving all interfaces in between disciplines.

The design goal for a turbine blade (or vane) is to reduce the temperature of the blade surface to within the material capability using a minimum amount of cooling flow. The internal geometry is designed to sufficiently cool the blade allowing it to efficiently operate at very high temperatures. Cooling fluid extracted from the compressor is circulated through internal serpentine passages that internally cool the blade by a combination of convection and impingement cooling. The design intent in the internal passages is to maximize the heat transfer coefficient. Flow is extracted from the internal cooling circuit and ejected through numerous small holes located near the leading edge, as well as along the pressure side and suction side of the external surface for film cooling purposes. The turbine blade geometry and associated fluid dynamics and thermodynamics is complex, three-dimensional and unsteady. The internal flow-fields alone can be quite challenging to study computationally due to the internal serpentine cooling circuit. The external flow-field is challenging to model computationally due in part to the scales of the film cooling holes in relation to the overall geometry.

Traditionally, the heat transfer problem has been studied by decoupling the external flow, internal flow and film cooling holes. By this, we mean that the modeling of the external flow, internal flow and film cooling holes is done separately. Thermal modeling of a modern convective/film cooled gas turbine airfoil has traditionally been distributed over three domains. They include a flow path fluid domain (calculated with correlation or computational fluid dynamics or CFD), an internal cooling fluid domain (calculated with correlation or CFD), and an airfoil solid domain (calculated with finite element analysis or FEA). The three domains must communicate together in order to achieve a balance of mass flow and thermal energy. This communication between the three domains has typically been achieved through script driven transfer of thermal/flow boundary condition information, which is a time consuming and error prone process.

Recent modeling of cooled turbine airfoils include the use of conjugate heat transfer in which not only is the heat transfer in the turbine material accounted for but also the coupling between the internal and the film cooling of the turbine material. Conjugate heat transfer modeling simultaneously solves all three domains in a single coupled model, potentially saving time and virtually eliminating heat balance errors between the three domains. The metal temperature and gas pressure information may be passed directly to the FEA mechanical model. However, prior art conjugate simulations for entire internal and film cooled turbine blades are few due to the high computational cost.

A majority of the cooling air (and therefore the design effort) in modern turbines is used by the first and second stage airfoils for cooling. These cooling designs tend to have a high convective efficiency internal cooling schemes that exhaust cooling air in the form of film cooling. A modern cooled industrial power turbine airfoil may have multiple serpentine passages feeding about 1000 film holes. To further add to the complexity, internal cooling effectiveness is augmented by around 100 turbulators or around 2000 impingement holes. All features are important to the thermal model and cannot be neglected without compromising physical accuracy. However, conjugate CFD analysis of such a configuration is not practical due to the meshing effort and the computational demands.

The primary difficulty associated with conjugate analysis of the aforementioned modern airfoil is a result of miss-matched length scales. For example, an industrial gas turbine airfoil may have a passage height of about 200 mm which is a manageable solution by industry standards but approaching the upper limit of practicality for use in an iterative design environment. This same 200 mm airfoil may have around 1000 plus film holes with a diameter of around 1.0 mm. It is known that a maximum cell size of $1/10^{th}$ to $1/50^{th}$ of the hole diameter is required to capture film hole physics for accurate prediction of film cooling. To decrease average flow path cell size from 1.0 mm to 0.1 mm increases the mesh size by three orders of magnitude. Accordingly, aggressive mesh size transition (high manpower) must be used to keep computational demands within the limits of practicality. Many attempts have been made to automate the meshing process. However, the geometric complexity of internal cooling circuits has largely prevented efficient automation.

BRIEF SUMMARY OF THE INVENTION

It is an object of the present invention to provide for a process of designing an air cooled turbine airfoil with a significantly reduced computational time.

It is another object of the present invention to provide for a process of designing an air cooled turbine airfoil in which an iterative process is used but without the need for remeshing.

It is another object of the present invention to provide for a conjugate CFD process of designing an air cooled turbine airfoil in which the accuracy is improved over the prior art processes.

It is another object of the present invention to provide for a process of designing an air cooled turbine airfoil using a hybrid analysis that includes part detailed meshing and part grid extraneous modeling so that the designer can focus more effort in critical regions and therefore create more accurate predictions.

It is another object of the present invention to provide for an air cooled turbine airfoil designed using the process of the present invention.

The turbine airfoil, such as a rotor blade or a stator vane, includes an internal cooling circuit with cooling holes, impingement holes and turbulators strategically placed to provide a high level of cooling while using a minimal amount of cooling air. The present invention is a process for designing the internal cooling passages with these small scale features using a meshed solid model in a FEA program to perform the CFD analysis. Instead of modeling these small scale features (cooling holes, impingement holes, and turbulators) in the meshed FEA solid model, most of the small scale features are replaced by grid extraneous source terms in which the small scale feature is eliminated from the solid model and replaced with point source terms. The source terms can duplicate the effect of the feature within the analysis without requiring the complex analysis that such features would require in the analysis.

Text files for each of the cooling holes, impingement holes and turbulators are inputted and then translated into grid extraneous source terms that include position, energy, and continuity. A conjugate CFD solver performs an analysis and produces new values for the thermal and other boundary conditions. If the conjugate CFD solution does not converge to within a desired level, the source terms are updated and the conjugate CFD solver performs another analysis. The source terms are updated and the conjugate CFD solver is re-analyzed until the solution converges.

The use of the grid extraneous source terms eliminates the need for modeling all or most of the small scale features that represent the cooling holes, impingement holes and turbulators. As such, the FEA meshed model is less complex and requires much less time to analyze. A much faster solution for the design of the cooling circuit of the airfoil can be accomplished.

If warranted, a small number of the grid extraneous source terms can be replaced with detailed modeling of the small scale features in critical areas, or other areas of interest. The cooling holes, or impingement holes or turbulators that appear is critical areas of the meshed model can be analyzed by using the actual structure of the feature in order to increase the fidelity and more accurately analyze the solid model.

BRIEF DESCRIPTION OF THE SEVERAL VIEWS OF THE DRAWINGS

FIG. 1a shows a cross section view of a turbulator in a cooling flow passage.

FIG. 1b shows a representation of a prior art CFD model for the turbulators of FIG. 1a.

FIG. 1c shows a side view of a grid extraneous representation of the turbulators according to the process of the present invention.

FIG. 1d shows a top view of a grid extraneous representation of the turbulators according to the process of the present invention.

FIG. 2a shows a cross section view of a film hole in a cooling flow passage.

FIG. 2b shows a representation of a prior art CFD model for the film hole of FIG. 2a.

FIG. 2c shows a side view of a grid extraneous representation of the film hole according to the process of the present invention.

FIG. 3a shows a cross section view of an impingement hole in a cooling flow passage.

FIG. 3b shows a representation of a low resolution CFD model for the impingement hole of FIG. 3a.

FIG. 3c shows a side view of a grid extraneous representation of the impingement hole according to the process of the present invention.

DETAILED DESCRIPTION OF THE INVENTION

Figure 4:
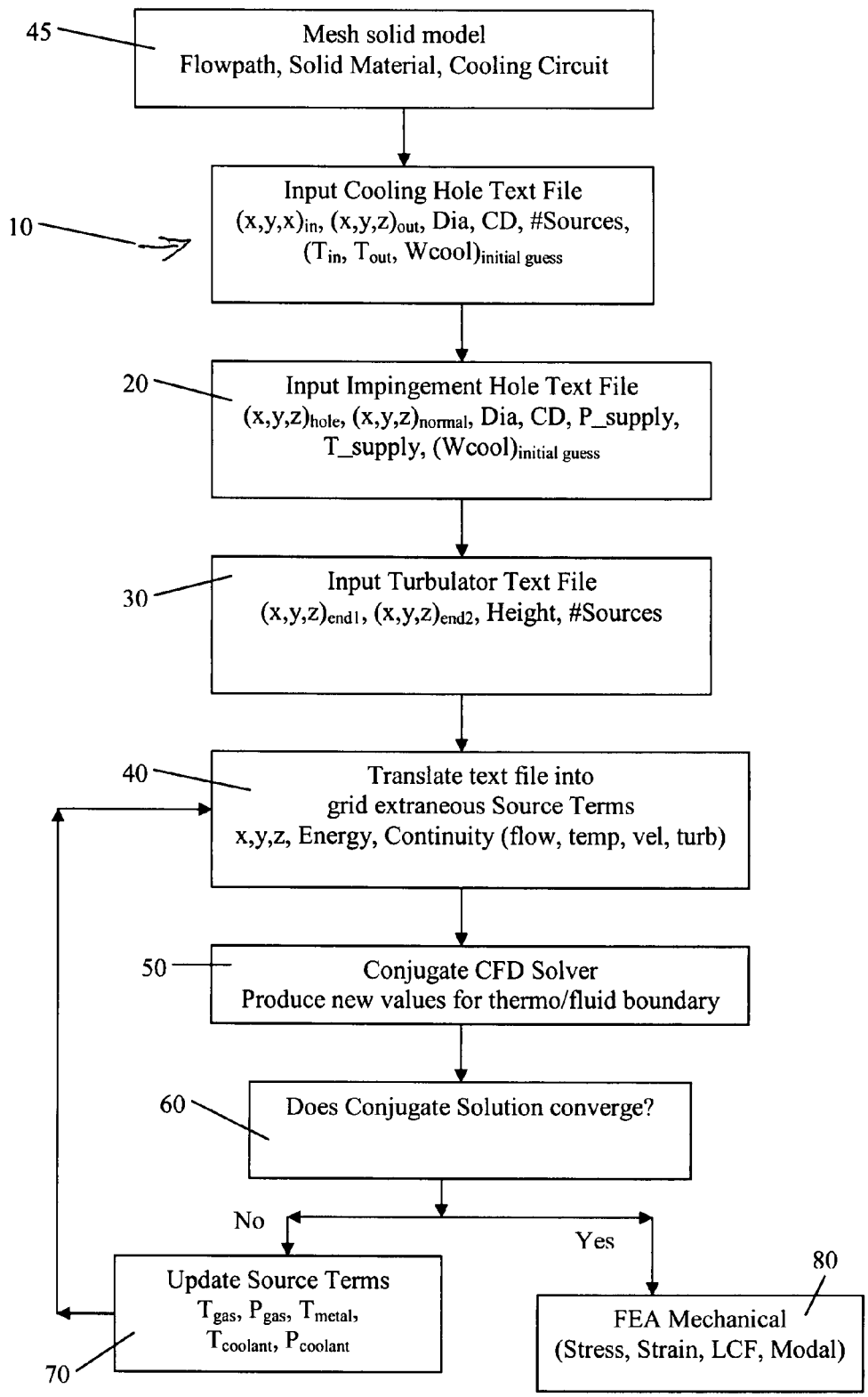
FIG. 4 shows a flow chart for the steps in the process of the present invention.

The proposed conjugate CFD thermal design process omits the small scale features (turbulators, film holes, impingement holes) from the FEA mesh and, instead, meshes only the large scale flow path and internal cooling passages within the turbine airfoil. The turbine airfoil can be a stator vane or a rotor blade. Grid extraneous source terms (mass/momentum/energy) are used to capture the effect of these small scale features as shown in FIGS. 1 through 3.

The novel aspect of the approach of the present invention is the manner in which the source terms are created and controlled. As shown in FIG. 4, the simple text files are created to describe the nature of the small scale features like the turbulators, the film holes and the impingement holes. This information is then translated into grid extraneous source terms used by the conjugate CFD solver. Source terms are known in the prior art FEA software used for engineering analysis. However, the prior art source terms are not updated during the analysis process as in the present invention. The CFD solution information (temperature and pressure) is passed back to a source management tool which alters the sources appropriately using compressible flow and heat transfer calculations. For example, the flow path and internal pressure from CFD would be used to recalculate the film hole flow, heat-up, and hole effusion heat transfer. The source term would be updated accordingly. The source term updating continues until the conjugate solution converges.

Grid extraneous modeling can be used in combination with detailed modeling of small features to create a "hybrid analysis". For example, in an airfoil analysis with around 1000 film holes, the engineer may choose to mesh around 20 film cooling holes in a particularly critical region of the airfoil for maximum resolution/accuracy while choosing to use grid extraneous modeling for the remaining 980 non-critical film holes in order to keep the analysis time practical.

FIG. 1a shows a turbulator in which the internal flow path with an unsteady vortex generated downstream from the turbulator as represented by the series of curved arrows. FIG. 1b shows a prior art steady state CFD with a structured grid and a turbulent mixing as represented by the tear drop shaped object downstream from the turbulators. FIG. 1c represents the source term for a turbulators appearing as a single point in the geometry of only the flow path according to the present invention. FIG. 1c is a side view of the flow path with the turbulators positioned with a specified height from the floor of the flow path. FIG. 1d shows a top view of the flow path with a string of source terms that represent the width of the turbulator in the flow path. The source terms that appear in the model as points can be located anywhere in the geometry such as on a node or in-between nodes of the FEA.

FIG. 2a shows the film hole similar to the representation of the turbulator in FIG. 1a. FIG. 2b shows the film hole in the prior art CFD grid similar to the turbulator in FIG. 1b. FIG. 2c shows the film hole with the source term for a film hole appearing as a single point in the geometry of only the flow path similar to the representation of the turbulator in FIG. 1c. Intermediate source terms through the metal remove or add heat that would typically be transferred through the wall of the hole. FIGS. 3a and 3b show an impingement hole and the prior art CFD grid. FIG. 3c shows the impingement hole with the source term for a film hole appearing as a single point in the geometry of only the flow path according to the present invention.

The process for conjugate CFD analysis of a turbine airfoil according to the present invention is represented by the flow chart in FIG. 4. A cooling hole input file representing the cooling holes used in the model with variable and constants is created and inputted into the process. Constants such as the geometric locations of the inlet and the outlet for each hole and variables that can change during the analysis such as hole diameter, discharge coefficient (CD), number of source terms for the hole, Temperature in and Temperature out, and the flow rate of the cooling air through the hole. An initial guess is used at the start of the analysis for the Tin, Tout and Wcool. FIG. 2c shows the source terms (points) used to represent one cooling hole in the analysis and includes one source term (point) at the upstream of the hole inlet that is in the flow path, one source term at the downstream of the hole in the flow path across the wall, and several source terms (points) in the wall and in line with the geometry of the cooling hole.

An impingement hole input file is also created and inputted into the analysis, and includes constants and variables that change during the analysis such as the geometric position of the hole, the normal angle of the hole, the hole diameter, the discharge coefficient (CD), the supply pressure of the hole, the supply temperature of the hole, and the flow rate of cooling air passing through the hole. An initial guess for the flow rate is used at the start of the analysis. FIG. 3c shows the point representation of the single source term used to analyze the impingement hole.

A turbulator input file is also created for the turbulators in the model and includes constants and variables that can change during the analysis such as the geometric position of the first end of the turbulator, the position of the second end of the turbulator, the height of the turbulator, and the number of source terms for the turbulator. FIGS. 1c and 1d shows the point representation used to model the source terms for the turbulator in which FIG. 1c shows the side view having a height in the flow passage and FIG. 1d shows the top view having a width in the flow passage.

The turbulator text file, the cooling hole text file, and the impingement hole text file are all inputted into the analysis and translated into grid extraneous source terms in which each of the turbulators, cooling holes and impingement holes are represented by the source terms or points as represented in FIGS. 1c and 1d, 2c and 3c. The source terms will include the position (x,y,z), the Energy, the Continuity (flow, temp, velocity, turbulence) for each turbulator and hole.

Once all the source terms have been created, the meshed solid model is passed into the Conjugate CFD Solver with the grid extraneous source terms and analyzed to produce a value representing the thermo and fluid boundary conditions. The source terms are each updated as needed and the Conjugate CFD Solver reanalyzed until the Conjugate Solution converges. All of the updating of the source terms is performed by the process without input from the engineer until the convergence appears. When the Conjugate CFD Solver converges, the FEA meshed solid model is finished and passed on to the FEA Mechanical models for stress, strain, LCF and Modal analysis.

The main inventive concept in the present invention is the use of the source terms to represent the turbulators, the cooling holes, and the impingement holes in the meshed solid model in which the source terms are each updated until the model converges to an acceptable level. The primary benefit of this approach is the mesh simplicity and the reduced computational burden that results. This produces an order of magnitude in the reduction of the net analysis time. Also, since the source terms are extraneous to the mesh (the source terms can be changed without having to modify the mesh), they can be relocated or optimized without re-meshing, which greatly reduces the analysis effort in an iterative design process. Even the highest quality CFD solutions have shortfalls in predictive accuracy due to turbulence modeling, unsteady physics, or mesh resolution. In a closed form conjugate solution, the ability to alter the solution to match experimental or test data is limited. Since the source terms can be modified, the solution can be easily "tuned" to match data trends. The ability to create a hybrid analysis (part detailed meshing and part grid extraneous modeling) enables the engineer to focus effort in critical regions of the airfoil in order to create a more accurate prediction. Alternatively, the engineer would be forced to de-feature analysis over the entire domain (critical and non-critical) in order to maintain a reasonable analysis time.

We claim:

1. A process for designing an air cooled turbine airfoil comprising the steps of:
   generating a solid model of the turbine airfoil with an internal cooling passage;
   generating a mesh of the solid model with the internal cooling passage;
   inputting a text file for a plurality of small scale features that appears in the solid model;
   translate the text files into grid extraneous source terms;
   in a conjugate CFD solver, generating new values for the thermal or fluid boundary conditions;
   determining if the conjugate CFD solution converges; and,
   if the conjugate CFD solution does not converge, then update the source terms and run the conjugate CFD solver to produce new values for the thermal and fluid boundary conditions.

2. The process for designing an air cooled turbine airfoil of claim 1, and further comprising the step of:
   the solid model is a finite element analysis solid model; and,
   omitting the small scale features from the FEA solid model mesh and meshing only the internal cooling passage.

3. The process for designing an air cooled turbine airfoil of claim 1, and further comprising the step of:
   the small scale features are at least one of a plurality of cooling holes, a plurality of impingement holes, or a plurality of turbulators into the conjugate CFD solver.

4. The process for designing an air cooled turbine airfoil of claim 1, and further comprising the step of:
   the grid extraneous source terms include the position, the energy, and the continuity for each small scale feature.

5. The process for designing an air cooled turbine airfoil of claim 1, and further comprising the step of:
   modeling some of the small scale features that appear in critical regions of the airfoil without using grid extraneous source terms to create a hybrid analysis.

6. The process for designing an air cooled turbine airfoil of claim 5, and further comprising the step of:
   the hybrid analysis includes around 20 small scale features and around 980 non-critical features that use grid extraneous source terms.

7. The process for designing an air cooled turbine airfoil of claim 1, and further comprising the step of:
   the source terms include constants for the geometric locations of the inlet and the outlet for each cooling hole and other variables that can change during the analysis that include hole diameter, discharge coefficient, number of source terms for each hole, temperature in, temperature out, and the flow rate of cooling air through the holes.

8. The process for designing an air cooled turbine airfoil of claim 1, and further comprising the step of:
   the source terms include constants for the geometric locations of the inlet and the outlet for each impingement hole and other variables that can change during the analysis that include geometric position of the impingement hole, the normal angle of the impingement hole, the impingement hole diameter, the discharge coefficient, the supply pressure of the impingement hole, the supply temperature of the impingement hole, and the flow rate of the cooling air through the impingement holes.

9. The process for designing an air cooled turbine airfoil of claim 1, and further comprising the step of:
   the source terms include constants for the geometric positions of the first end of the turbulators, the position of the second end of the turbulators, the height of the turbulators, and the number of source terms for the turbulators.

10. The process for designing an air cooled turbine airfoil of claim 1, and further comprising the step of:
    after the conjugate CFD solver converges, performing mechanical modeling analysis on the FEA meshed solid model.

11. The process for designing an air cooled turbine airfoil of claim 10, and further comprising the step of:
    the mechanical modeling on the FEA mesh includes stress, strain, LCF and modal analysis.

12. The process for designing an air cooled turbine airfoil of claim 1, and further comprising the step of:
    the source terms represent cooling holes, impingement holes and turbulators in the meshed solid model, and the source terms are updated until the model converges to an acceptable level.

13. The process for designing an air cooled turbine airfoil of claim 12, and further comprising the step of:
    updating the source terms without having to modify the mesh of the FEA model.

* * * * *